(12) United States Patent
Ichinose

(10) Patent No.: US 12,023,998 B2
(45) Date of Patent: Jul. 2, 2024

(54) AUTOMATIC DOOR OPENING AND CLOSING SYSTEM

(71) Applicant: MITSUI KINZOKU ACT CORPORATION, Yokohama (JP)

(72) Inventor: Mikio Ichinose, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 488 days.

(21) Appl. No.: 17/418,444

(22) PCT Filed: Sep. 18, 2019

(86) PCT No.: PCT/JP2019/036609
§ 371 (c)(1),
(2) Date: Jun. 25, 2021

(87) PCT Pub. No.: WO2020/137034
PCT Pub. Date: Jul. 2, 2020

(65) Prior Publication Data
US 2022/0089003 A1    Mar. 24, 2022

(30) Foreign Application Priority Data

Dec. 27, 2018    (JP) .................................. 2018-245650

(51) Int. Cl.
*B60J 5/04*    (2006.01)
*E05B 81/64*    (2014.01)
(Continued)

(52) U.S. Cl.
CPC ................. *B60J 5/04* (2013.01); *E05B 81/64* (2013.01); *E05F 15/63* (2015.01); *E05F 15/655* (2015.01);
(Continued)

(58) Field of Classification Search
CPC . B60J 5/04; E05F 15/63; E05F 15/655; E05F 15/73; E05B 8/64; E05B 81/64
(Continued)

(56) References Cited

U.S. PATENT DOCUMENTS 7,761,209 B2    7/2010    Morris et al.
10,796,170 B2 *  10/2020    Ichinose ................. G06V 20/58
(Continued)

FOREIGN PATENT DOCUMENTS

CN    206797258 U    12/2017
CN    107839594 A    3/2018
(Continued)

OTHER PUBLICATIONS

International Searching Authority, "International Search Report," issued in connection with International Patent Application No. PCT/JP2019/036609, dated Nov. 26, 2019.
(Continued)

*Primary Examiner* — William D Titcomb
(74) *Attorney, Agent, or Firm* — Foley & Lardner LLP

(57) ABSTRACT

An automatic door opening and closing system is provided with: an image capture unit that captures an image of a road surface around the vehicle, including around a door; a door lock unit that locks the door into a closed state; a drive unit that opens/closes the door; an operation unit to which a door opening operation is input; a notification unit that notifies an occupant who has operated the operation unit of information; and a control device. When a door opening operation is input to the operation unit, the control device detects an obstacle present on the road surface around the door using a captured image acquired by the imaging unit. In response to detecting the obstacle, the control device performs at least
(Continued)

one of notification of the obstacle detection by the notification unit and invalidation of the door opening operation input to the operation unit.

7 Claims, 8 Drawing Sheets

(51) Int. Cl.
*E05F 15/63* (2015.01)
*E05F 15/655* (2015.01)
*E05F 15/73* (2015.01)

(52) U.S. Cl.
CPC ........ *E05F 15/73* (2015.01); *E05F 2015/767* (2015.01)

(58) Field of Classification Search
USPC ......................................................... 382/106
See application file for complete search history.

(56) References Cited

U.S. PATENT DOCUMENTS

| | | | | |
|---|---|---|---|---|
| 11,021,896 B2* | 6/2021 | Ichinose | ................ | E05B 81/76 |
| 11,086,335 B2* | 8/2021 | Kim | ................... | H04N 13/211 |
| 11,225,822 B2* | 1/2022 | Partsch | ................ | E05F 15/73 |
| 2006/0087430 A1* | 4/2006 | Zambon | ................... | G01J 5/14 |
| | | | | 340/567 |
| 2010/0076651 A1* | 3/2010 | Nakakura | ............... | E05C 17/00 |
| | | | | 701/49 |
| 2012/0140080 A1* | 6/2012 | Taylor | .................. | B60N 2/976 |
| | | | | 348/148 |
| 2013/0088578 A1* | 4/2013 | Umezawa | ............ | G06V 20/588 |
| | | | | 348/47 |
| 2015/0371095 A1* | 12/2015 | Hartmann | ............ | H04N 23/635 |
| | | | | 348/148 |
| 2016/0312517 A1* | 10/2016 | Elie | ........................ | E05F 15/73 |
| 2017/0124404 A1 | 5/2017 | Yamane et al. | | |
| 2017/0152698 A1* | 6/2017 | Bae | ........................ | E05F 15/73 |
| 2017/0185821 A1 | 6/2017 | Chen et al. | | |
| 2017/0185851 A1 | 6/2017 | Jeromin et al. | | |
| 2017/0234054 A1* | 8/2017 | Kumar | .................... | E05F 15/73 |
| | | | | 49/324 |
| 2017/0247932 A1* | 8/2017 | Partsch | ................ | B60J 5/0477 |
| 2017/0334380 A1* | 11/2017 | Bonnet | ............. | B60H 1/00778 |
| 2018/0016835 A1 | 1/2018 | Ichinose | | |
| 2019/0018413 A1* | 1/2019 | Wood | .................. | G05D 1/0214 |
| 2019/0024435 A1* | 1/2019 | Partsch | ................... | E05F 15/73 |
| 2019/0078371 A1* | 3/2019 | Pohl | ........................ | E05F 15/76 |
| 2019/0210518 A1* | 7/2019 | Michalakis | .............. | B60Q 9/00 |
| 2020/0032569 A1* | 1/2020 | Taylor | ..................... | E05F 15/63 |
| 2020/0141176 A1* | 5/2020 | Ichinose | ................ | E05F 15/73 |
| 2022/0089003 A1* | 3/2022 | Ichinose | ................ | E05F 15/43 |
| 2023/0041503 A1* | 2/2023 | Salter | ..................... | E05F 15/40 |

FOREIGN PATENT DOCUMENTS

| | | |
|---|---|---|
| JP | 2008-158958 A | 7/2008 |
| JP | 2010-101150 A | 5/2010 |
| JP | 2010-133901 A | 6/2010 |
| JP | 4930046 B2 | 5/2012 |
| JP | 2017-081422 A | 5/2017 |
| JP | 2018-009386 A | 1/2018 |

OTHER PUBLICATIONS

International Searching Authority, "Written Opinion," issued in connection with International Patent Application No. PCT/JP2019/036609, dated Nov. 26, 2019.

* cited by examiner

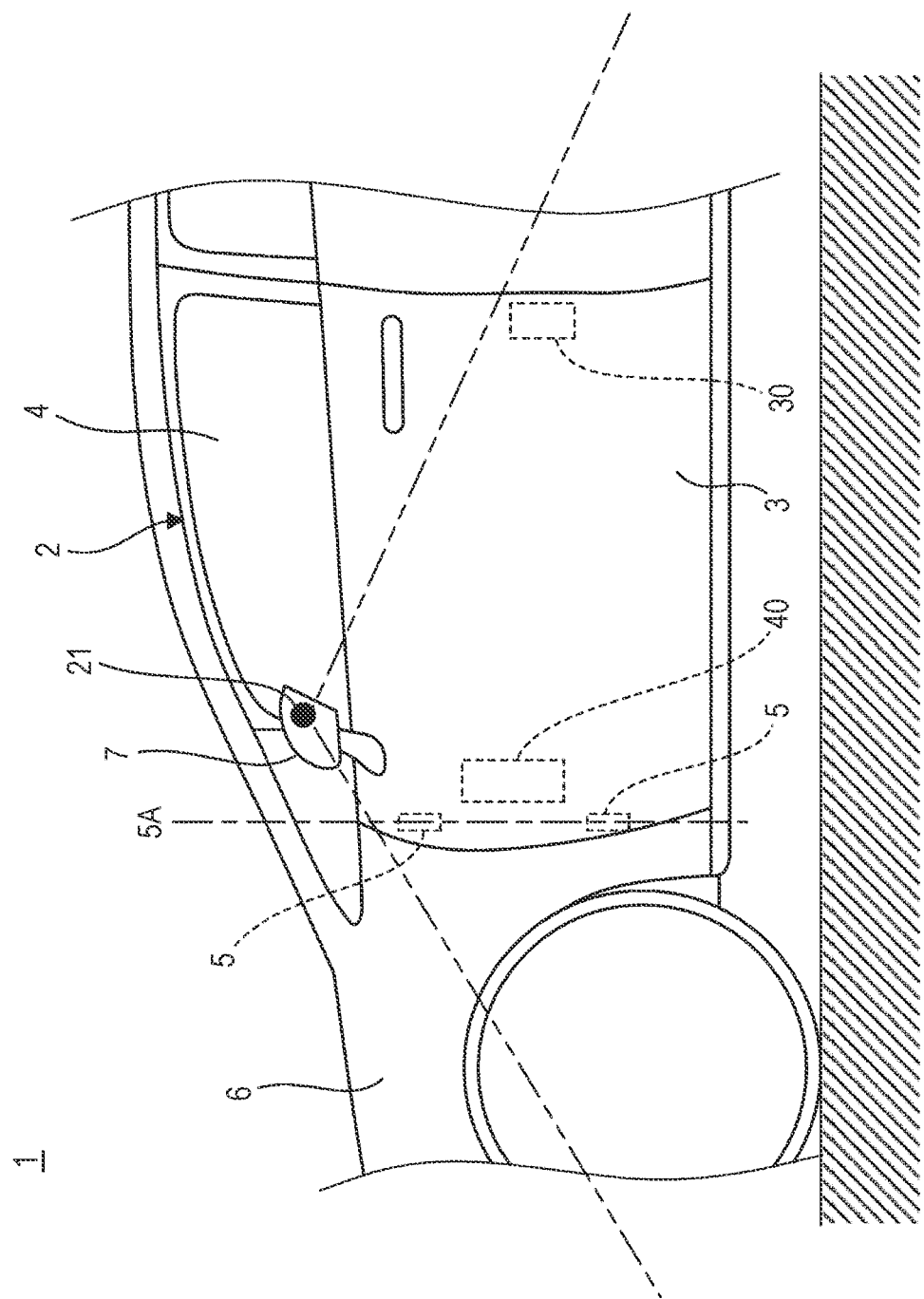

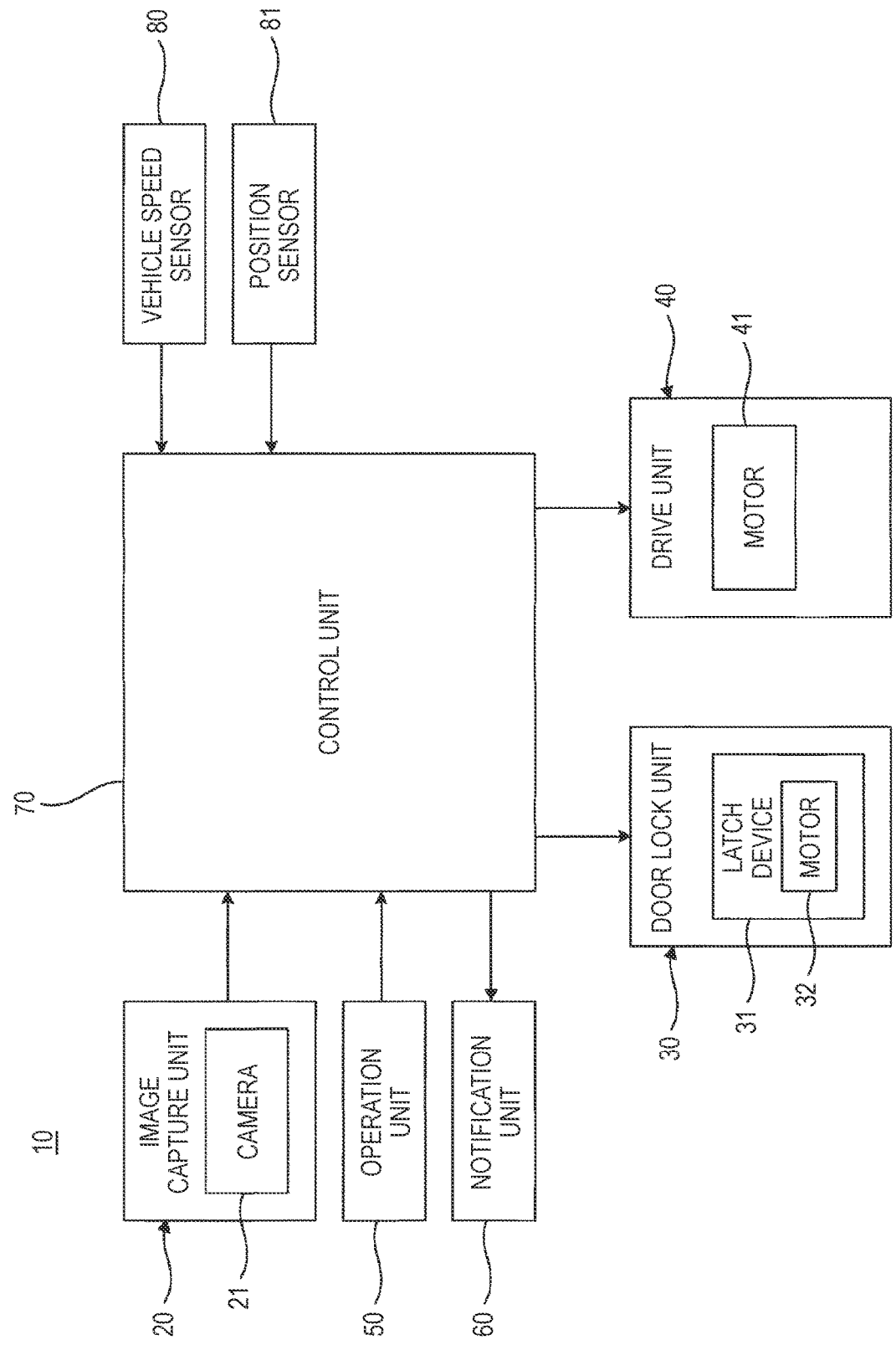
[FIG. 2]

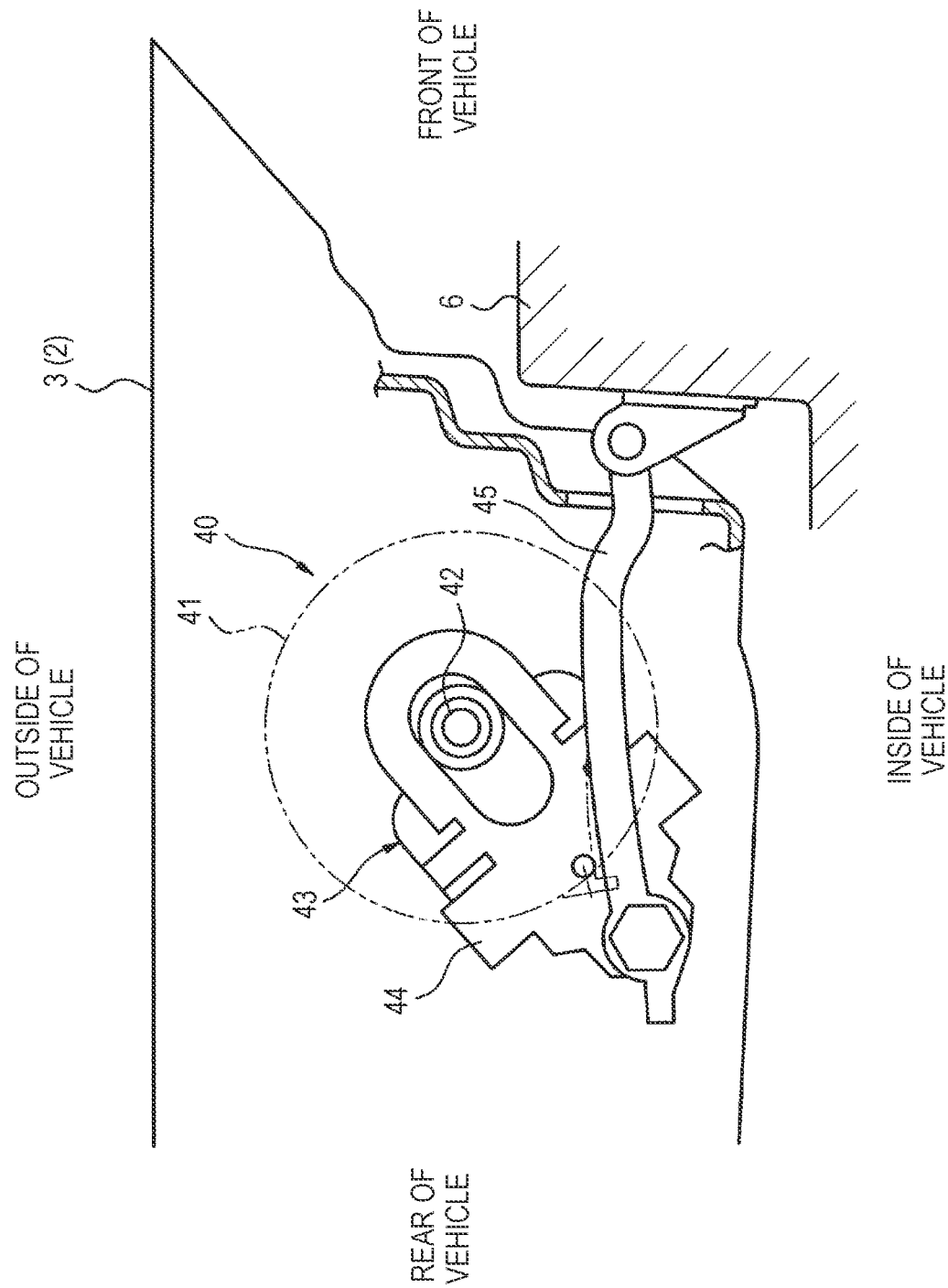
[FIG. 3]

[FIG. 4(a)]
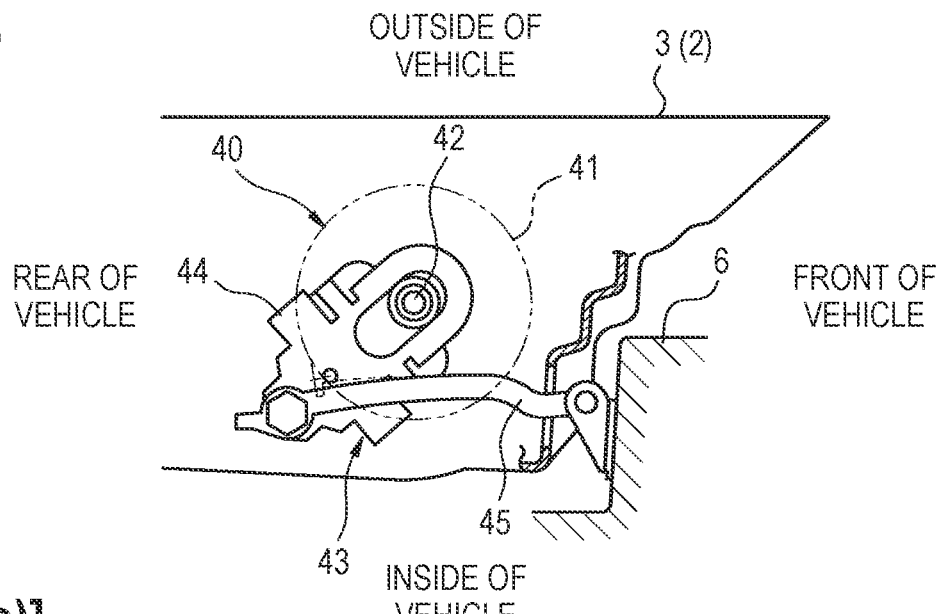
[FIG. 4(b)]
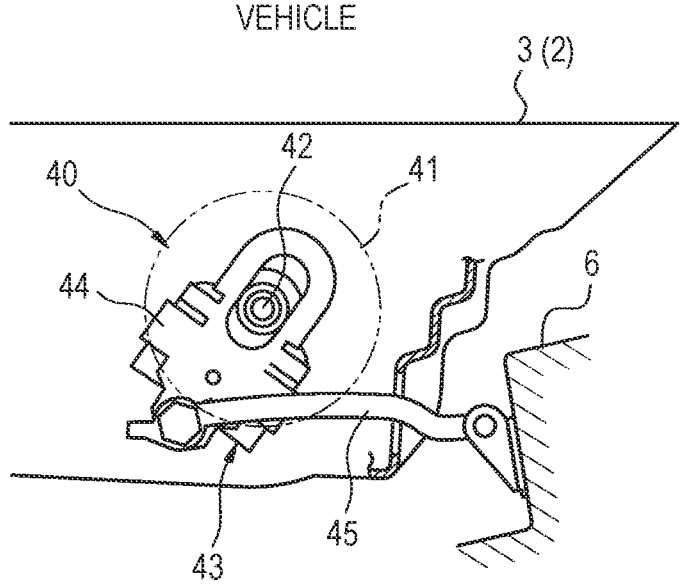
[FIG. 4(c)]
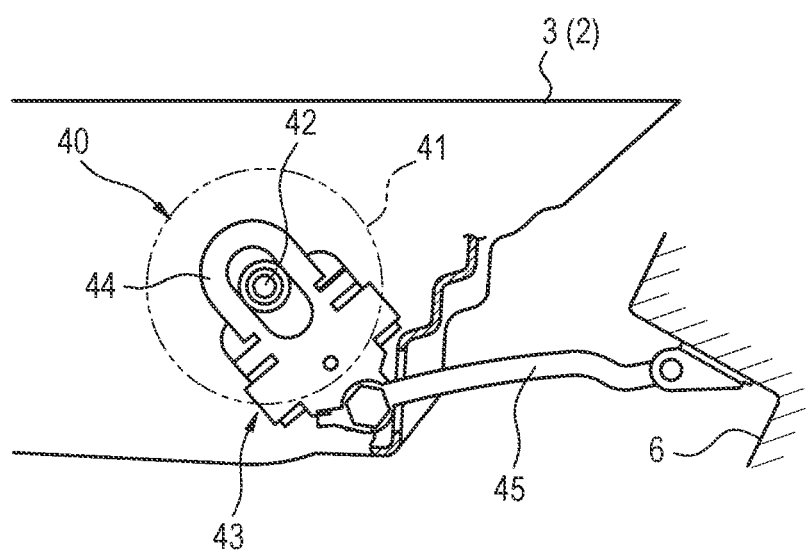

[FIG. 5]
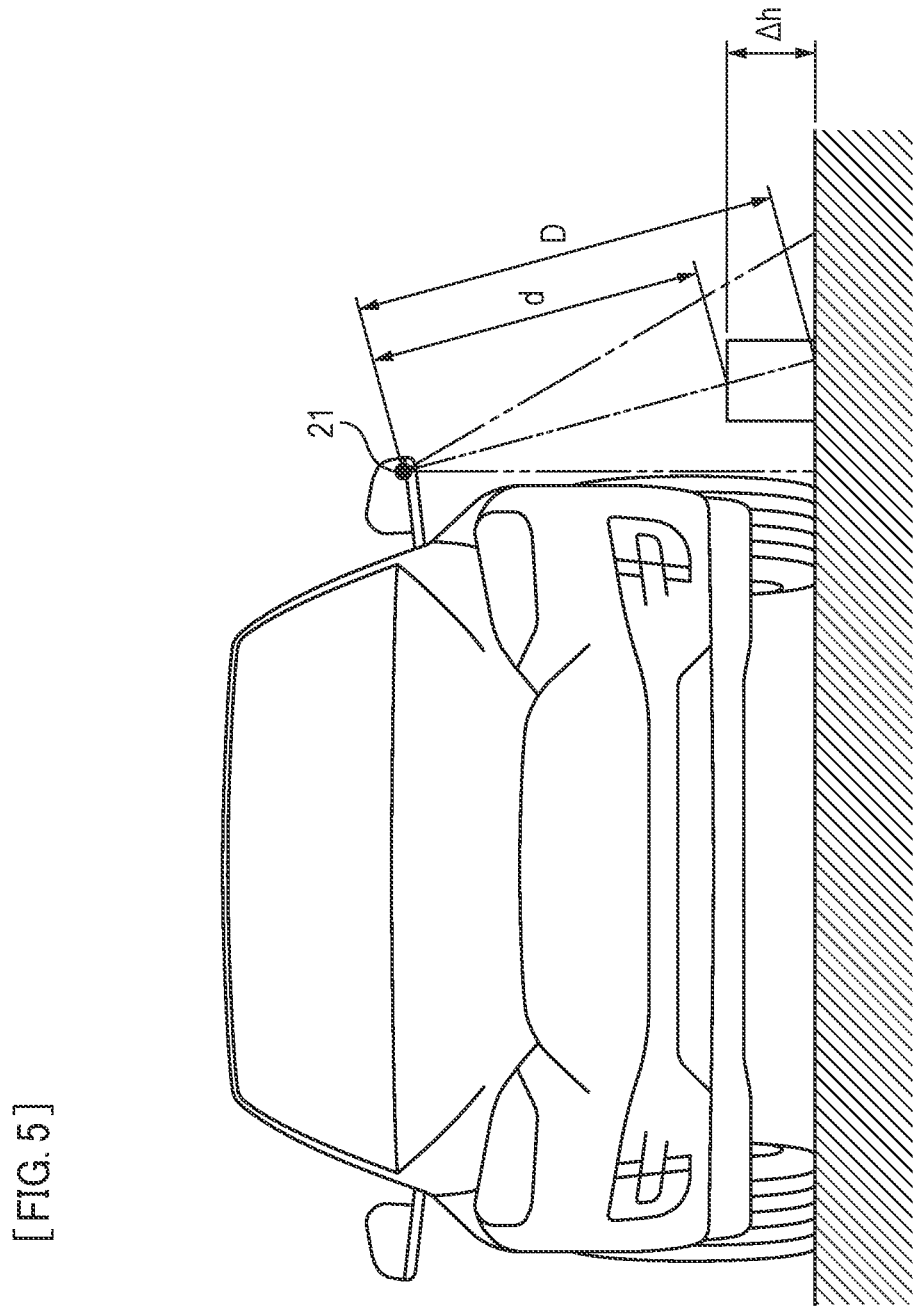

[FIG. 6]
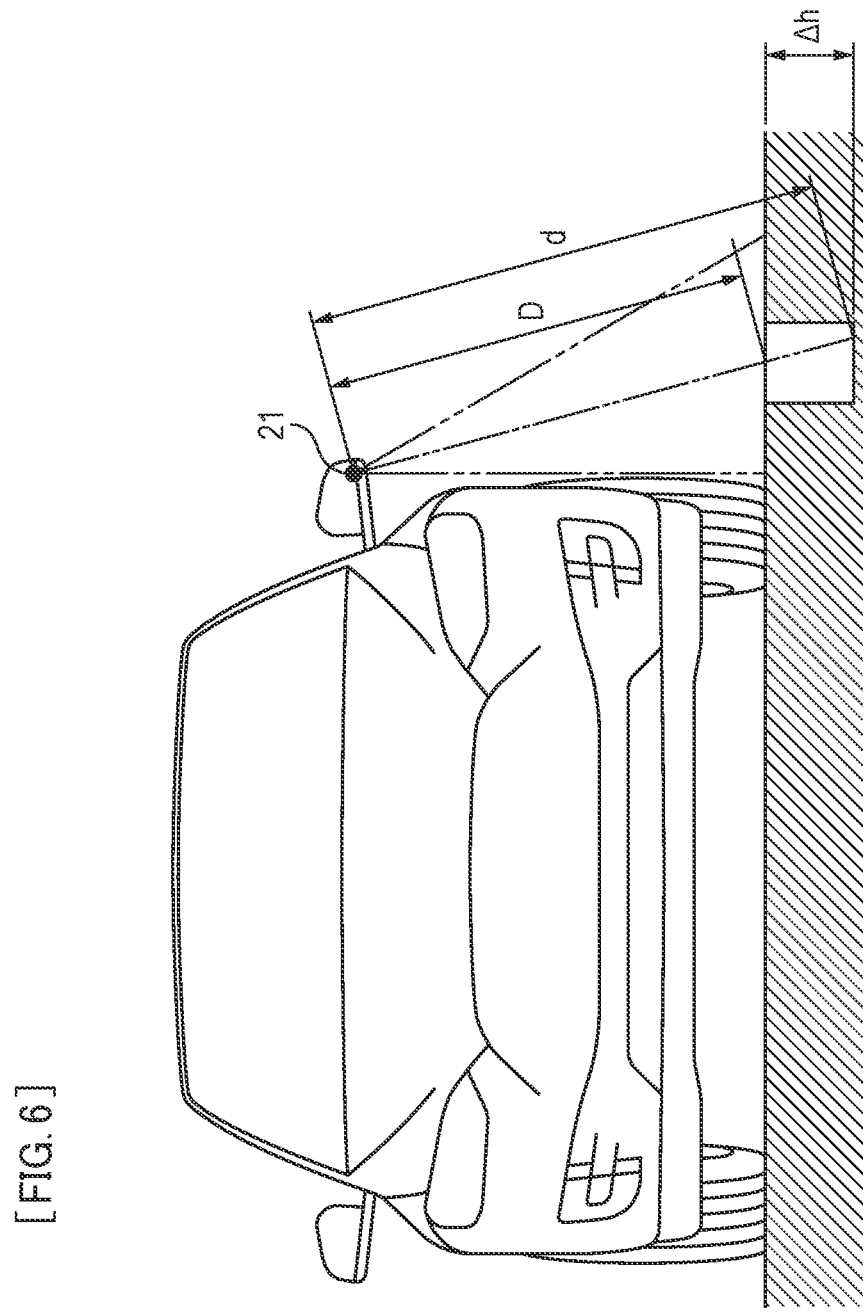

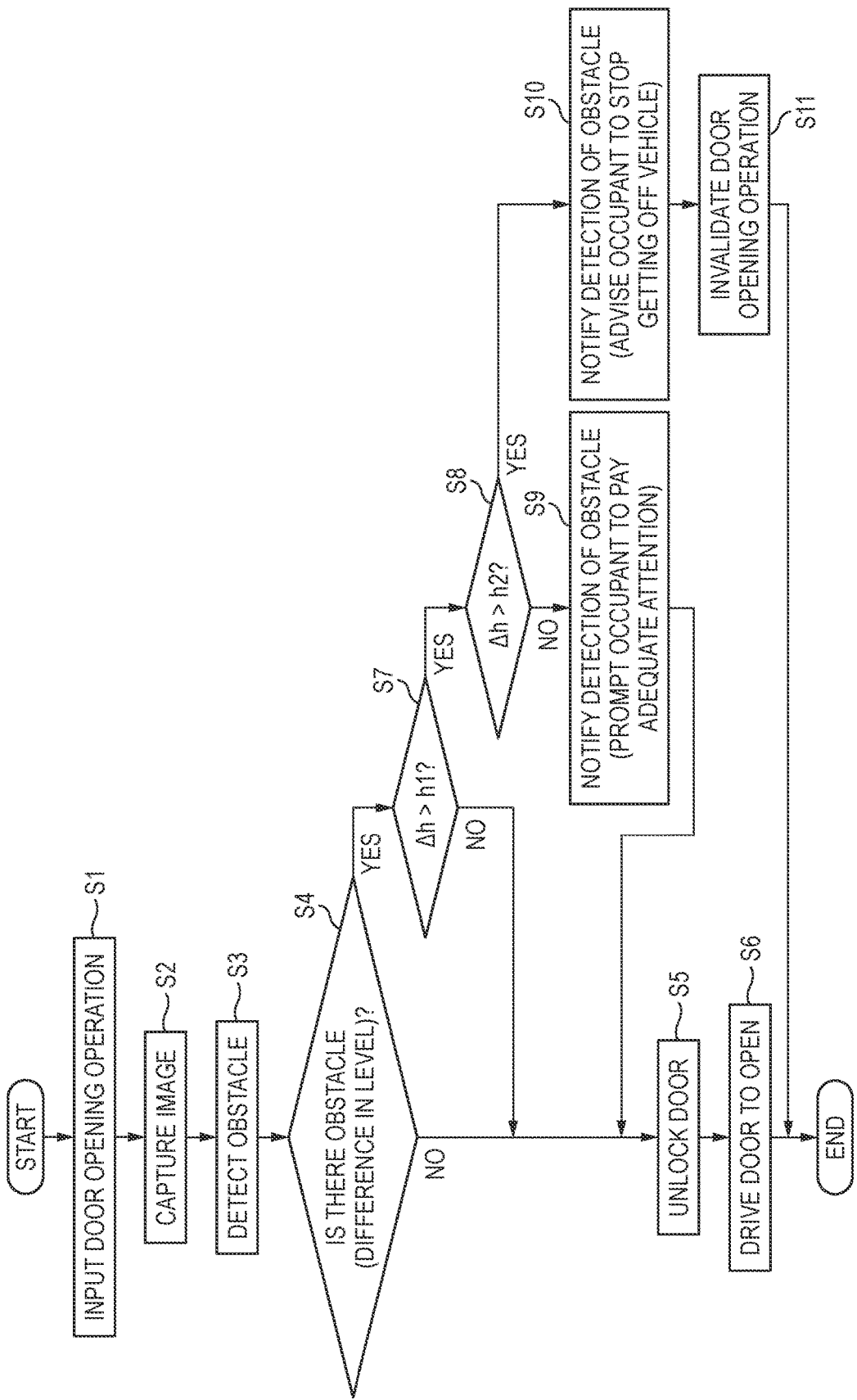
[FIG. 7]

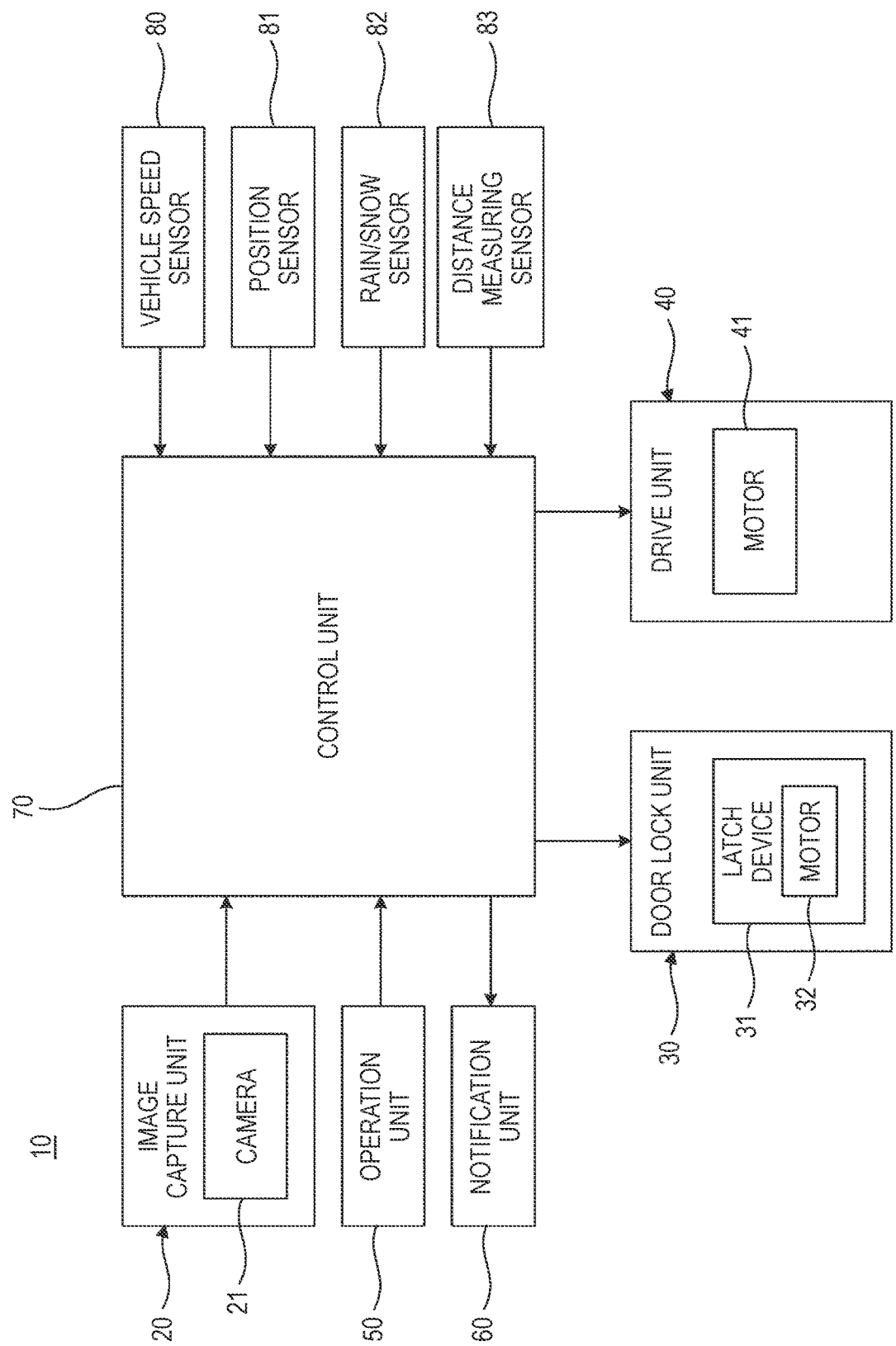
[FIG. 8]

AUTOMATIC DOOR OPENING AND CLOSING SYSTEM

CROSS-REFERENCE TO RELATED APPLICATIONS

The present application claims priority under 37 U.S.C. § 371 to International Patent Application No. PCT/JP2019/036609, filed Sep. 18, 2019, which claims priority to and the benefit of Japanese Patent Application No. 2018-245650, filed on Dec. 27, 2018. The contents of these applications are hereby incorporated by reference in their entireties.

TECHNICAL FIELD

The invention relates to an automatic door opening and closing system for automatically opening and closing a door of a vehicle.

BACKGROUND ART

A system is known which is configured to automatically open and close a door of a vehicle by driving the door using a motor. Then, a system is also known which is configured to detect an obstacle lying on a trajectory of an opening door to thereby stop the door opening further. For example, in a system described in PTL 1, an obstacle lying on a trajectory of an opening door is detected by measuring a distance between a door and an object using an ultrasonic sensor or the like that is placed on a pillar of a vehicle body.

Additionally, a system is also known which is configured to detect a three-dimensional object (an obstacle) existing on the periphery of a vehicle with a view to assisting a driver to park the vehicle. For example, in a system described in PTL 2, a bird's-eye view of a vehicle is generated using a plurality of cameras, and the bird's-eye view of the vehicle is divided into areas by edge lines extracted from the bird's-eye view, whereby types of road surfaces (a driving road surface, an off-road surface, a three-dimensional object) of the divided areas are determined based on feature amounts such as textures.

CITATION LIST

Patent Literatures

PTL 1: U.S. Pat. No. 7,761,209
PTL 2: Japanese Patent No. 4930046

SUMMARY OF INVENTION

Technical Problem

When an occupant of a vehicle manually opens a door of the vehicle to get off the vehicle, the occupant can naturally see the condition of a road surface on the periphery of the door that falls within his or her field of vision. On the other hand, when the door of the vehicle is automatically opened, although this will make getting off the vehicle more convenient, there may be a possibility that the occupant tends to fail to give adequate attention to the condition of the road surface on the periphery of the door. For example, in the case where a difference in level exists on a road surface on the periphery of the door due to a curb or a ditch, in the event that the occupant fails to give adequate attention to the condition of the road surface, he or she may stumble or fall.

The invention has been made in view of the situations described above, and an object thereof is to provide an automatic door opening and closing system configured to prevent an occupant of a vehicle from getting off the vehicle inadvertently by detecting an obstacle existing on a road surface on the periphery of a door.

Solution to Problem

An automatic door opening and closing system according to one aspect of the present invention includes: an image capture unit configured to capture an image of a road surface on a periphery of a vehicle including a periphery of a door; a door lock unit configured to lock the door in a closed state; a drive unit configured to open and close the door; an operation unit provided on a side of the door facing an interior of a passenger compartment, a door opening operation to cause the door lock unit to unlock the door and the drive unit to open the door being input into the operation unit; a notification unit configured to notify an occupant who has operated the operation unit of information; and a control unit configured to control the door lock unit, the drive unit, and the notification unit, and the control unit is configured to: when the door opening operation is input to the operation unit, detect an obstacle existing on a road surface on the periphery of the door by use of an image captured by the image capture unit; and in a case of detecting the obstacle, perform at least one of causing the notification unit to perform a notification of the detection of the obstacle or invalidating the door opening operation input to the operation unit.

Advantageous Effects of Invention

According to the invention, it is possible to provide the automatic door opening and closing system configured to prevent the occupant of the vehicle from getting off the vehicle inadvertently by detecting the obstacle existing on the road surface on the periphery of the door.

BRIEF DESCRIPTION OF DRAWINGS

FIG. 1 is a schematic drawing showing an example of a vehicle to which an automatic door opening and closing system according to an embodiment of the invention is applied.

FIG. 2 is a block diagram showing an example of functional blocks of the automatic door opening and closing system according to the embodiment of the invention.

FIG. 3 is a schematic drawing showing an example of a drive unit shown in
FIG. 2.

FIGS. 4(a)-4(c) show schematic drawings illustrating operations of the drive unit shown in FIG. 3, in which FIG. 4(a) is a schematic drawing showing a case where a door is closed, FIG. 4(b) is a schematic drawing showing a case where the door is ajar or partially opened, and FIG. 4(c) is a schematic drawing showing a case where the door is open.

FIG. 5 is a schematic drawing showing an example of an obstacle existing on a road surface on the periphery of the door.

FIG. 6 is a schematic drawing showing another example of an obstacle existing on a road surface on the periphery of the door.

FIG. 7 is a flowchart showing an example of a door opening process that is executed by the control unit shown in FIG. 2.

FIG. 8 is a block diagram showing a modified example of functional blocks of the automatic door opening and closing system shown in FIG. 2.

DESCRIPTION OF EMBODIMENT

FIG. 1 shows an example of a vehicle to which an automatic door opening and closing system according to an embodiment of the invention is applied, and FIG. 2 shows an example of functional flocks of the automatic door opening and closing system.

A vehicle 1 shown in FIG. 1 is a so-called sedan-type vehicle, and an automatic door opening and closing system applied to the vehicle 1 automatically opens and closes a door 2 of the vehicle 1. The door 2 includes a door main body 3 and window glass 4 that can be retracted into the door main body 3. The door 2 is attached to a body 6 of the vehicle 1 by a pair of hinges 5 provided at a front end portion of the door main body 3. The door 2 is configured to be revolved around a hinge axis 5A of the pair of hinges 5 in a horizontal direction so as to be opened and closed.

Incidentally, the door 2 is a swing door that is opened and closed in the horizontal direction. Meanwhile, the door to be automatically opened and closed by the automatic door opening and closing system may be a gull-wing door that opens and closes in a vertical direction or a sliding door. Alternatively, the door to be automatically opened and closed by the automatic door opening and closing system may be any one or all of a driver's seat-side door, a front passenger's seat-side door, and rear side doors of a vehicle.

As shown in FIG. 2, an automatic door opening and closing system 10 applied to the vehicle 1 includes an image capture unit 20, a door lock unit 30, a drive unit 40, an operation unit 50, a notification unit 60, and a control unit 70 for controlling the door lock unit 30, the drive unit 40, and the notification unit 60 and detects an obstacle existing on a road surface on the periphery of the door 2 that is automatically opened and closed to control the opening and closing of the door 2 according to the results of the detection. A detection target obstacle may be an object that would block a way of an occupant who attempts to get off the vehicle 1. For example, an unevenness or a difference in level caused by a curb or a ditch, a portion formed of a different material locally in an asphalted road surface such as a lid of a manhole or a tiled portion that is more slippery than the asphalted road surface or the like, can be exemplified as the detection target obstacle.

The image capture unit 20 includes one or more cameras 21 using a solid-state imaging device such as a charge coupled device (CCD) image sensor, a complementary metal-oxide-semiconductor (CMOS) image sensor, or the like. The image capture unit 20 captures an image of a road surface on the periphery of the vehicle 1 including the periphery of the door 2 that is automatically opened and closed. FIG. 1 shows an installation example of the camera or cameras 21 in a case where a front passenger's seat-side door is automatically opened and closed, in which case the camera or cameras 21 are installed in an outside rear view mirror portion 7 provided on the front passenger's seat-side door.

The number and installing location of cameras 21 are set as required depending upon a door that is automatically opened and closed. For example, in the case where the driver's seat-side door and the front passenger's seat-side door are automatically opened and closed, or in the case where rear side doors on both a driver's seat side and a front passenger's seat side are automatically opened and closed, or in the case where the driver's seat-side door and the front passenger's seat-side door, as well as the rear side doors on both the driver's seat side and the front passenger's seat side are automatically opened and closed, the cameras 21 can be installed in the outside rear view mirror portion 7 on the front passenger's seat-side door and in an outside rear view mirror portion 7 provided on the driver's seat-side door.

Here, in a vehicle installing a so-called around view monitor which provides a bird's eye view of the vehicle with a view to assisting a driver in parking his or her vehicle, a camera is installed in each of four locations at a front part and a rear part of the vehicle, as well as outside rear view mirror portions on a driver's seat-side and a front passenger's seat-side doors. In the cameras provided for the around view monitor, the cameras installed in the outside rear view mirror portions can preferably be used as the cameras 21 of the automatic door opening and closing system 10. Additionally, in a vehicle installing so-called electronic outside rear view mirrors in which the functions of conventional outside rear view mirrors provided on the front side doors are replaced by cameras and monitors, the cameras are installed in positions corresponding to the positions where the conventional outside rear view mirrors are provided. These cameras for the electronic outside rear view mirrors can preferably be used as the cameras 21 of the automatic door opening and closing system 10. However, the installing locations of the cameras 21 are not limited to the outside rear view mirror portions 7, and hence, a camera installing location can be set as required as long as the camera installed can capture an image of a road surface lying on the periphery of the door 2 that is automatically opened and closed.

The door lock unit 30 includes a striker (not shown) that is attached to the body 6 of the vehicle 1 and a latch device 31 attached to the door 2. The door 2 is closed by the latch device 31 locking the striker to be held in a securely closed state. The latch device 31 includes a motor 32. As a result of the motor 32 being caused to operate by the control unit 70, the latch device 31 releases the striker. According thereto, the lock of the door 2 is released, whereby the door 2 can be opened.

The drive unit 40 includes a motor 41 as a drive source. As the motor 41 is caused to operate by the control unit 70, the drive unit 40 drives the door 2 in a door opening direction or a door closing direction.

The operation unit 50 is provided at an inner side, that is, a side facing an interior of a passenger compartment, of the door 2 that is automatically opened and closed. The operation unit 50 may be made up of a switch such as a touch switch or a depression switch. When the occupant gets off the vehicle, an instruction to start a door opening operation is input into the operation unit 50 for causing the door lock unit 30 to unlock the striker and the drive unit 40 to open the door 2 that is automatically opened and closed.

The notification unit 60 is provided in the vicinity of the door 2 that is automatically opened and closed within the interior of the passenger compartment of the vehicle 1. In a case an obstacle is detected on a road surface on the periphery of the door 2, the notification unit 60 performs a notification of the detection of the obstacle to the occupant who has operated the operation unit 50 on the door 2, that is, the occupant who attempts to get off the vehicle 1. As a notification method, for example, a speaker may be provided in the door 2 to output a voice message saying "Watch your step" from the speaker. A light emitting device such as a light emitting diode (LED) may be provided at a lower portion on the passenger compartment side of the door 2 to be illuminated or turned on and off to notify the occupant of the detection of the obstacle.

The control unit 70 includes one or a plurality of processors and storage medium such as a read only memory (ROM) and a random access memory (ROM) that are configured to hold control programs to be executed by the processor or processors and the results of processing executed by the processor or processors. The control unit 70, which performs operation in accordance with the programs, detects an obstacle existing on a road surface on the periphery of the door 2 that is automatically opened and closed by use of an image of the road surface captured by the image capture unit 20 and controls the door lock unit 30 and the drive unit 40 in accordance with the results of the detection, so as to open or close the door 2.

The control unit 70 is electrically connected with a vehicle speed sensor 80 configured to detect a speed of the vehicle 1. Further, the control unit 70 is electrically connected with a position sensor 81 configured to detect a position of the door 2 that is opened. A vehicle speed signal outputted from the vehicle speed sensor 80 and a position signal outputted from the position sensor 81 are both input into the control unit 70.

FIG. 3 shows an example of the drive unit 40. FIGS. 4(a)-4(c) show operations of the drive unit 40, and more specifically, FIG. 4(a) shows a case where the door 2 is closed, FIG. 4(b) shows a case where the door 2 is left ajar or is partially opened, and FIG. 4(c) shows a case where the door 2 is opened.

The drive unit 40 is disposed at the front end portion of the door main body 3. The drive unit 40 includes the motor 41, an output shaft 42, and a link mechanism 43. The motor 41 is attached to an inner panel of the door main body 3 via an appropriate bracket. The output shaft 42 is coupled to the body 6 via the link mechanism 43.

The link mechanism 43 includes a drive arm 44 and a driven arm 45. The drive arm 44 is fixed to the output shaft 42. A proximal end portion of the driven arm 45 is connected rotatably to the drive arm 44, while a distal end portion of the driven arm 45 is connected to the body 6. By this configuration, the door 2 is opened and closed as the motor 41 rotates.

Assuming that the locking of the door 2 by the door lock unit 30 is released, for example, with the door 2 left in a closed state as shown in FIG. 4(a), when the motor 41 rotates forwards, the rotation of the motor 41 is transmitted to the driven arm 45 by way of the output shaft 42 and the drive arm 44, whereby the driven arm 45 is pushed out from the door main body 3. As the driven arm 45 is pushed out, the door 2 is opened, as shown in FIGS. 4(b) and 4(c).

On the other hand, with the door 2 left in an opened state as shown in FIG. 4(c), when the motor 41 rotates reversely, the rotation of the motor 41 is transmitted to the driven arm 45 by way of the output shaft 42 and the drive arm 44, whereby the driven arm 45 is retracted into the door main body 3. In accordance with the retraction of the driven arm 45, the door 2 is closed as shown in FIGS. 4(b) and 4(a).

Incidentally, a clutch mechanism (not shown) may be provided between the motor 41 and the output shaft 42. In the case where the door 2 is manually opened and closed, the clutch mechanism cuts out a transmission of power between the motor 41 and the output shaft 42. As a result, the effort with which the door 2 is manually opened and closed becomes light.

Hereinafter, a method will be described which the control unit 70 adopts when it detects an obstacle existing on a road surface on the periphery of the door 2. FIG. 5 shows a case where a difference in level due to a curb exists on a road surface, and FIG. 6 shows a case where a difference in level due to a ditch exists on a road surface.

A difference in level existing on a road surface can be detected from an image as follows, for example. Firstly, assuming that no difference in level exists on a road surface, a distance between a portion on the road surface shown in a captured image and the camera 21 is determined based on a known installation height of the camera 21 and a position of the portion on the road surface shown in the captured image, and the distance so determined is referred to as a reference distance D of the portion on the road surface. Then, a distance d between the portion on the road surface shown in the captured image and the camera 21 is obtained from the captured image, and a difference in level existing on the road surface can be detected based on a difference between the obtained distance d and the reference distance D, whereby a difference in height Δh can be detected based on the difference in level. Here, the difference in height Δh is a distance (an absolute value) between the road surface and a top portion or a bottom of the difference in level in a vertical direction with respect to the road surface. In other words, the difference in level due to the curb shown in FIG. 5 is a positive or protruding difference in level from the road surface, and a position of a top portion of the curb from the road surface is referred to as +Δh. On the other hand, the difference in level due to the ditch shown in FIG. 6 is a negative or depressed difference in level from the road surface, and a position of a bottom portion of the ditch from the road surface is referred to as Δh.

The method for obtaining a distance between each portions on the road surface imaged in a captured image and the camera 21 from the captured image is briefly divided into a method using a stereo camera and a method using a monocular camera. In the method using the stereo camera, a distance is obtained from a set of images including a parallax captured by the stereo camera based on the principle of triangulation. In the method using the monocular camera, a captured image is passed through, for example, a color filter to thereby generate a blur and a color shift in accordance with a distance in the image, so that a distance is obtained by analyzing the blur and the color shift in the single captured image that has been obtained.

Additionally, as an example of a method for detecting, from a captured image, a portion formed of a different material locally in an asphalted road surface such as a lid of a manhole or a tiled portion that is more slippery than the asphalted road surface, a method described in PTL 2 can be exemplified. Specifically, edges are extracted from an image, and the image is divided into areas by the extracted edges, and materials of the areas are determined from feature amounts such as textures of the individual areas, whereby a portion formed of a different material locally in the asphalted road surface can be detected.

FIG. 7 shows an example of a door opening process that the control unit 70 executes.

Firstly, the control unit 70 determines whether the vehicle 1 has stopped based on a vehicle speed signal input thereinto from the vehicle speed sensor 80, starts the door opening process on condition that the vehicle 1 is at halt, and receives a door opening operation input for the operation unit 50. Then, when the door opening operation is input into the operation unit 50 (step S1), the control unit 70 causes the image capture unit 20 to capture an image to thereby acquire an image of a road surface on the periphery of the door 2 (step S2).

Next, the control unit 70 detects an obstacle existing on the road surface on the periphery of the door 2 by use of the image acquired (step S3). The detection method for detecting a difference in level as an obstacle and the detection method for detecting a portion formed of a different material locally in the asphalted road surface that are described above are used. Hereinafter, the door opening process will be described by taking a case where a difference in level is detected as an example.

If obstacle including a difference in level is not detected (No in step S4), the control unit 70 causes the door lock unit 30 to operate to unlock the door 2 (step S5) and causes the drive unit 40 to operate to open the door 2 (step S6). Then, the control unit 70 detects continuously a position of the door 2 based on a position signal input thereinto from the position sensor 81 and stops the drive unit 40 at a timing when the position of the door 2 reaches a set angle, ending the door opening process.

If a difference in level is detected (YES in step S4), the control unit 70 determines whether a height difference Δh of the difference in level detected exceeds a first threshold h1 (step S7). If the height difference Δh of the difference in level is the first threshold h1 or smaller (NO in step S7), the control unit 70 does not regard the difference in level as an obstacle and performs similar steps to those performed when no difference in level is detected, that is, the control unit 70 causes the door lock unit 30 to operate to unlock the door 2 (step S5) and causes the drive unit 40 to operate to open the door 2 (step S6). On the other hand, if the height difference Δh of the difference in level exceeds the first threshold h1 (YES in step S7), the control unit 70 determines the difference in level detected as an obstacle and then determines whether the height difference Δh of the difference in level exceeds a second threshold h2 that is greater than the first threshold h1 (step S8).

If the height difference Δh of the difference in level is the second threshold h2 or smaller (NO in step S8), the control unit 70 determines the difference in level detected as a less hazardous obstacle and firstly causes the notification unit 60 to perform a notification of a detection of the obstacle (step S9). Thereafter, the control unit 70 causes the door lock unit 30 to operate to unlock the door 2 (step S5) and then causes the drive unit 40 to operate to open the door 2 (step S6). In a case of performing a notification of a detection of an obstacle using a speech sound, for example, a speech sound, saying "Watch your step" is outputted in step S9, prompting the occupant to pay adequate attention to a road surface on the periphery of the door 2. This can prevent the occupant from getting off the vehicle inadvertently.

On the other hand, if the height difference Δh of the difference in level exceeds the second threshold h2 (YES in step S8), the control unit 70 determines the difference in level detected as a more hazardous obstacle and causes the notification unit 60 to perform a notification of a detection of the obstacle (step S10). Further, the control unit 70 invalidates the door opening operation input into the operation unit 50 (step S11) and ends the door opening process. In a case of performing a notification of a detection of an obstacle using a speech sound, for example, a speech sound, saying "A hazard exists near your step. Move the vehicle to get a safer step." is outputted in step S10, advising the occupant to stop getting off the vehicle.

The first threshold h1 and the second threshold h2 used for determination of a degree of the height difference Δh of the difference in level can be set as required. For example, the first threshold h1 may be set at 10 mm, and the second threshold h2 may be set at 30 mm.

Although not shown, if a portion formed of a different material locally in the asphalted road surface is detected, the control unit 70 firstly causes the notification unit 60 to perform a notification of a detection of an obstacle, prompting the occupant to pay adequate attention to the road surface on the periphery of the door 2. Then, the control unit 70 causes the door lock unit 30 to operate to unlock the door 2 and causes the drive unit 40 to operate to open the door 2. This can prevent the occupant from getting off the vehicle inadvertently.

FIG. 8 shows a modified example of functional blocks of the automatic door opening and closing system 10.

In the example shown in FIG. 8, the automatic door opening and closing system 10 further includes a rain/snow sensor 82 configured to detect rain and snow and a distance sensor 83 of which measuring range includes a road surface on the periphery of the door 2. A rain/snow detection signal is outputted from the rain/snow sensor 82 to be input into the control unit 70, and a measurement signal indicating a distance distribution over the road surface on the periphery of the door 2 is outputted from the distance sensor 83 to be input into the control unit 70.

The rain/snow sensor 82 is, for example, an optical sensor configured to detect rain drops and snow drops that pass through a detection area using infrared radiation or an electric sensor configured to detect rain drops and snow drops that adhere between electrodes by energizing the electrodes. The distance sensor 83 is, for example, a sensor configured to measure a distance from an object using ultrasonic wave, a light detection and ranging or laser imaging detection and ranging (LiDAR) process, or a millimeter wave radar.

In the door opening process shown in FIG. 7, when a rain/snow detection signal is input thereinto, the control unit 70 reduces the first threshold h1 and the second threshold h2 that are used to determine a degree of the height difference Δh of the difference in level. A wet road surface is slippery, and the occupant who gets off the vehicle on the wet road surface tends to easily slip and fall. To cope with this risk, when rainfall or snowfall is detected, the first threshold h1 that determines a criterion for notifying the occupant to pay adequate attention and the second threshold h2 that determines a criterion for invalidating the door opening operation are reduced to thereby prevent the occupant from falling when he or she steps on the wet or snow-covered road surface.

Additionally, the control unit 70 detects a difference in level existing on a road surface on the periphery of the door 2 based on an image of the road surface captured by the image capture unit 20 and a distance distribution over the road surface on the periphery of the door 2 measured by the distance sensor 83. This can enhance a detection accuracy of a difference in level and a measuring accuracy of a height difference of the difference in level.

Thus, as has been described heretofore, the automatic door opening and closing system disclosed in this description includes: an image capture unit configured to capture an image of a road surface on the periphery of a vehicle including the periphery of a door; a door lock unit configured to lock the door in the closed state; a drive unit configured to open and close the door; an operation unit provided on the inner side of the door that faces the interior of a passenger compartment, a door opening operation to cause the door lock unit to unlock the door and the drive unit to open the door being input to the operation unit; a notification unit configured to notify the occupant who has operated the operation unit of information; and a control unit configured to control the door lock unit, the drive unit, and the notification unit. The control unit is configured to: when the door opening operation is input to the operation unit, detect an obstacle existing on the road surface on the periphery of the door by use of an image captured by the image capture unit; and in a case of detecting the obstacle, perform at least one of causing the notification unit to perform a notification of a detection of the obstacle or invalidating the door opening operation input to the operation unit.

Additionally, in the automatic door opening and closing system disclosed in this description, the control unit is configured to: detect a difference in level existing on the road surface on the periphery of the door by use of the captured image; in a case of detecting a difference in level whose height difference exceeds the first threshold, determine the difference in level detected as the obstacle and perform at least one of causing the notification unit to perform the notification of the detection of the obstacle or invalidating an unlocking operation by the door lock unit; and in a case of detecting a difference in level whose height difference is equal to or smaller than the first threshold, release the lock by the door lock.

In the automatic door opening and closing system disclosed in this description, in a case the control unit detects a difference in level whose height difference exceeds the second threshold that is greater than the first threshold, the control unit causes the notification unit to perform the notification of the detection of the obstacle and invalidates the door opening operation input for the operation unit, and in a case the control unit detects a difference in level whose height difference exceeds the first threshold but is equal to or smaller than the second threshold, the control unit causes the notification unit to perform the notification of the detection of the obstacle and thereafter releases the lock by the door lock unit.

The automatic door opening and closing system disclosed in this description further includes the sensor configured to detect rainfall and snowfall, and when the sensor detects rainfall or snowfall, the control unit reduces the first threshold.

In addition, the automatic door opening and closing system disclosed in this description further includes the rain/snow sensor configured to detect rainfall and snowfall, and when the sensor detects rainfall or snowfall, the control unit reduces the second threshold.

Additionally, the automatic door opening and closing system disclosed in this description further includes a distance sensor having a measuring range which includes a road surface on the periphery of the door, and the control unit is configured to detect the difference in level based on the captured image and a distance distribution over the road surface on the periphery of the door measured by the distance sensor.

In the automatic door opening and closing system disclosed in this description, the control unit is configured to detect a portion formed of a different material locally in a road surface on the periphery of the door as the obstacle by use of the captured image.

INDUSTRIAL APPLICABILITY

The invention can be applied to an automatic door opening and closing system for automatically opening and closing a door of a vehicle such as a motor vehicle or the like by driving a motor.

Thus, while the embodiment of the invention has been described in detail, the embodiment is merely an example, and hence, the invention can be carried out in various modified forms without departing from the spirit and scope of the invention. This patent application is based on Japanese Patent Application (No. 2018-245650) filed on Dec. 27, 2018, the contents of which are incorporated herein by reference.

REFERENCE SIGNS LIST

1: vehicle
2: door
3: door main body
4: window glass
5: hinge
6: body
7: outside rearview mirror portion
10: automatic door opening and closing system
20: image capture unit
21: camera
30: door lock unit
31: latch device
32: motor
40: drive unit
41: motor
42: output shaft
43: link mechanism
44: drive arm
45: driven arm
50: operation unit
60: notification unit
70: control unit
80: vehicle speed sensor
81: position sensor
82: rain/snow sensor
83: distance sensor
h1: first threshold
h2: second threshold
Δh: height difference

The invention claimed is:

1. An automatic door opening and closing system comprising:
an image capture device configured to capture an image of a road surface on a periphery of a vehicle including a periphery of a door;
a door lock device configured to lock the door in a closed state;
a drive mechanism configured to open and close the door;
an operation interface provided on a side of the door facing an interior of a passenger compartment, a door opening operation to cause the door lock device to unlock the door and the drive mechanism to open the door being input into the operation interface;
a notification device configured to notify an occupant who has operated the operation interface of information; and
a controller configured to control the door lock device, the drive mechanism, and the notification device, the controller being configured to:
when the door opening operation is input to the operation interface, detect an obstacle existing on a road surface on the periphery of the door by use of an image captured by the image capture device; and
in a case of detecting the obstacle, perform at least one of controlling the notification device to perform a notification of the detection of the obstacle or invalidating the door opening operation input to the operation interface, and wherein the controller is further configured to:

detect a difference in a height level on the road surface on the periphery of the door in a direction perpendicular to a front-back direction of the vehicle by use of an image captured in the periphery of the door;

in a case the detected difference in the height level exceeds a first threshold, determine that the detected difference in the height level is the obstacle and perform at least one of controlling the notification device to perform the notification of the detection of the obstacle or invalidating the door opening operation input to the operation interface; and in a case of the detected difference in the height level is equal to or smaller than the first threshold control the door lock device to unlock the door.

2. The automatic door opening and closing system according to claim 1, wherein the controller is further configured to:

in a case the detected difference in the height level exceeds a second threshold that is greater than the first threshold, control the notification device to perform the notification of the detection of the obstacle and invalidate the door opening operation input to the operation interface; and in a case of the detected difference in the height level exceeds the first threshold and is equal to or smaller than the second threshold, control the notification device to perform the notification of the detection of the obstacle and thereafter control the door lock device to unlock the door.

3. The automatic door opening and closing system according to claim 2, further comprising:

a rain/snow sensor configured to detect rainfall and snowfall, wherein in the case the rain/snow sensor detects rainfall or snowfall, the controller reduces the second threshold.

4. The automatic door opening and closing system according to claim 1, further comprising:

a rain/snow sensor configured to detect rainfall and/or snowfall, wherein in a case the rain/snow sensor detects rainfall or snowfall, the controller reduces the first threshold.

5. The automatic door opening and closing system according to claim 1, further comprising:

a distance sensor having measuring range including the road surface on the periphery of the door, wherein the controller is further configured to detect the difference in the height level based on the image captured in the periphery of the door and a distance distribution over the road surface on the periphery of the door measured by the distance sensor.

6. The automatic door opening and closing system according to claim 1, wherein the controller is further configured to detect a portion formed of a different material in the road surface on the periphery of the door as the obstacle by use of the image captured in the periphery of the door.

7. The automatic door opening and closing system according to claim 1, wherein the difference in the height level is detected in detected using a single image capturing device.

* * * * *